June 23, 1931. S. H. LEWIS 1,811,434
FLUID PRESSURE OPERATED VALVE GEAR SHIFTING MECHANISM
Filed Sept. 5, 1923 3 Sheets-Sheet 1
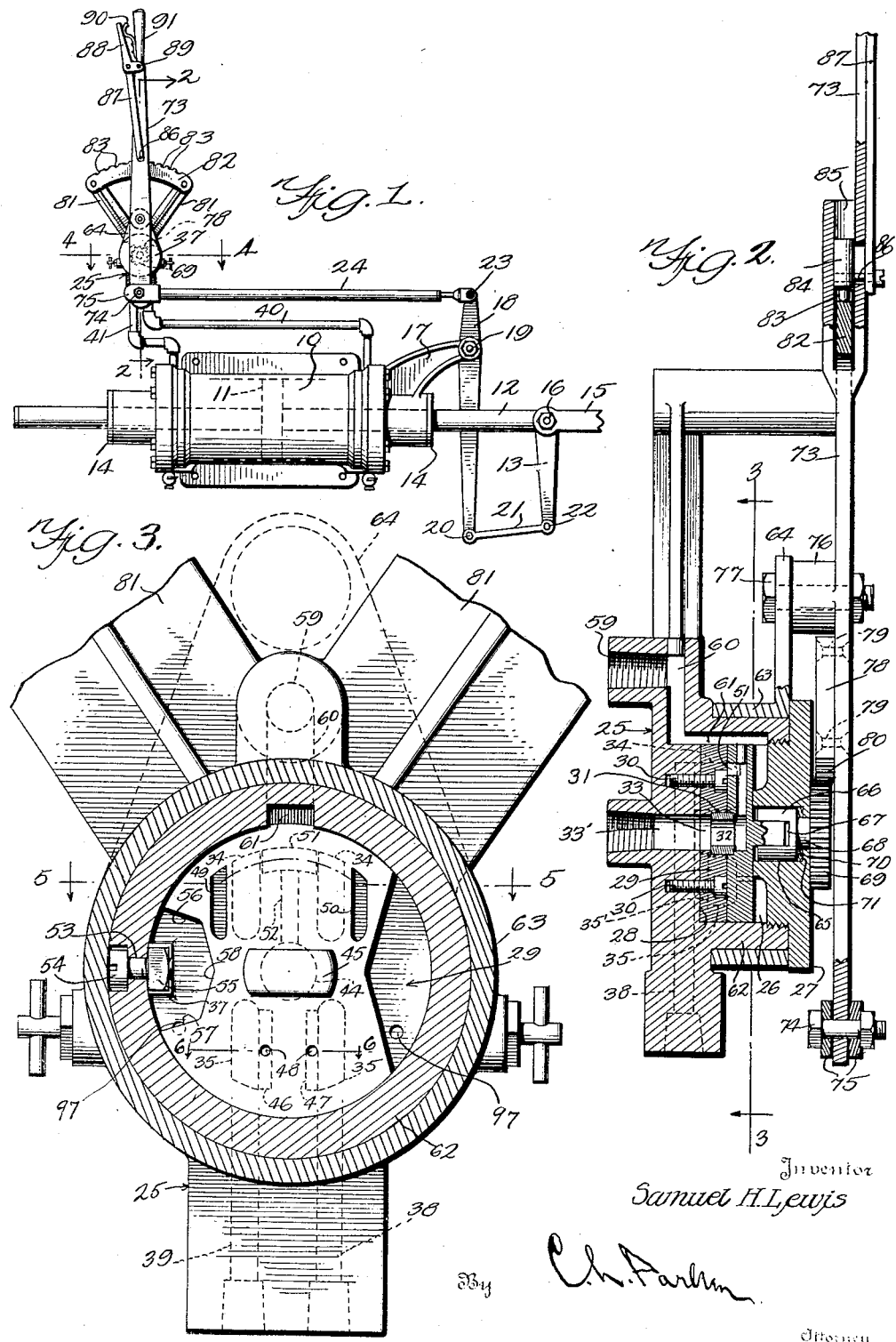
Inventor
Samuel H. Lewis
By
Attorney

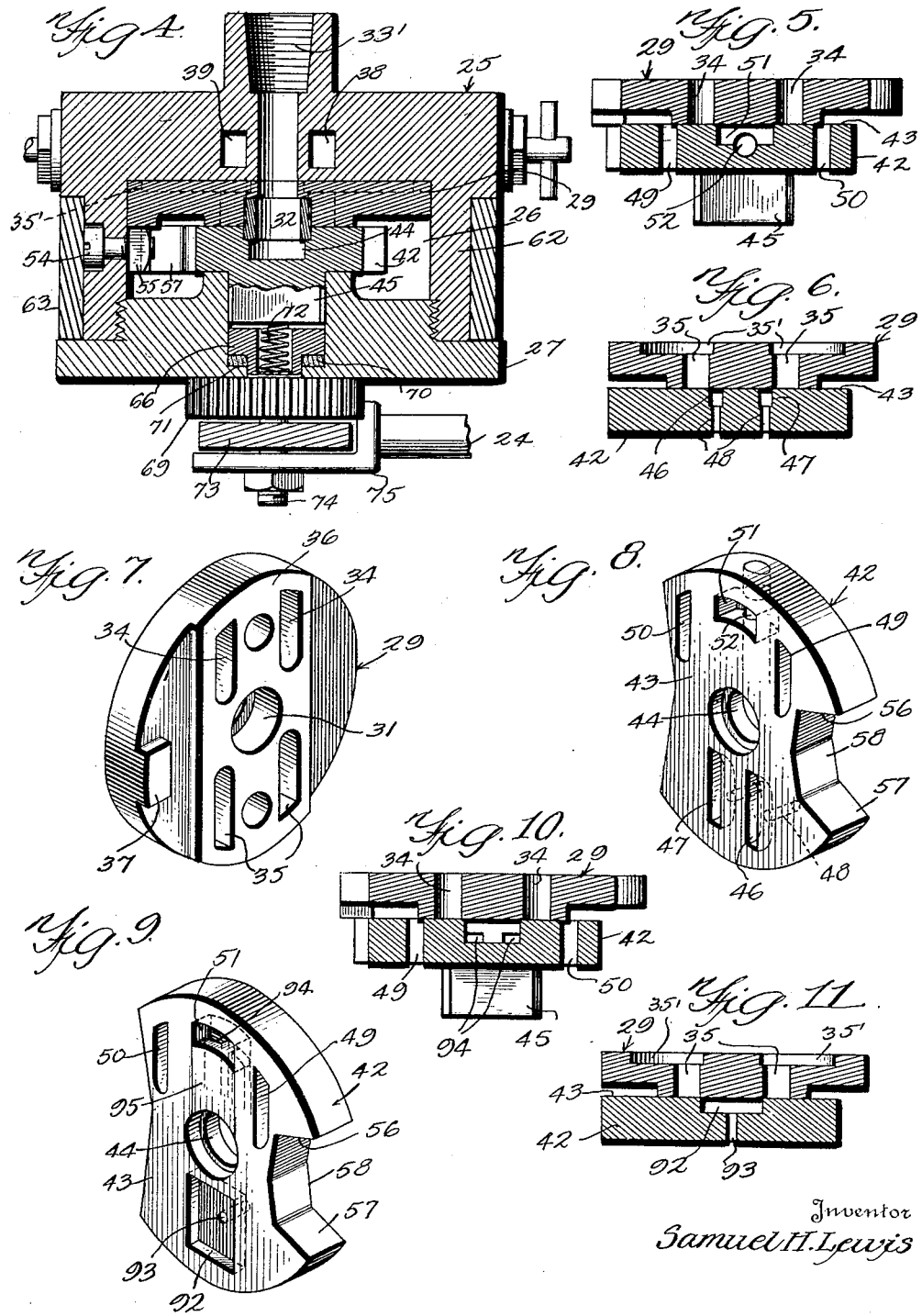

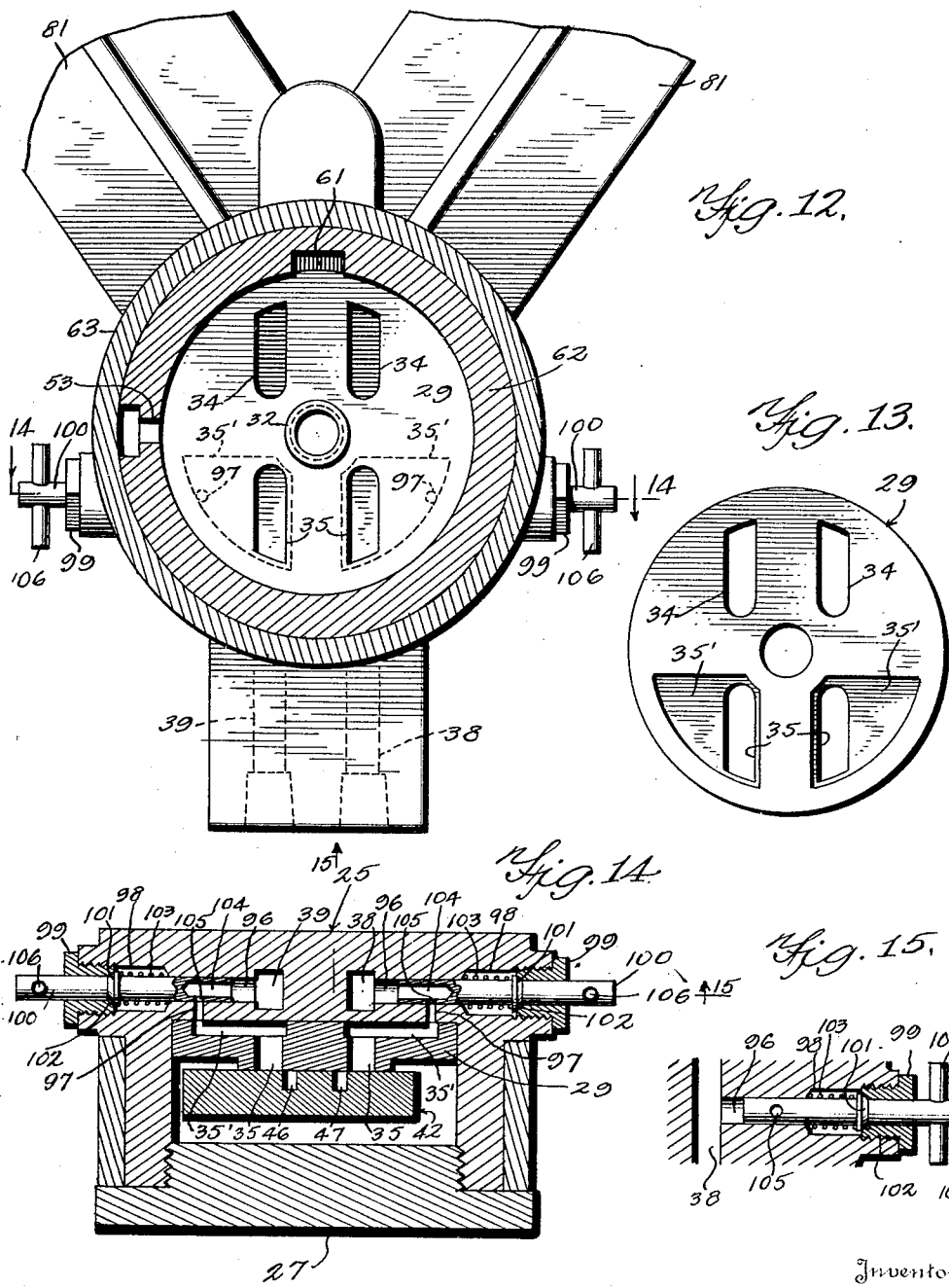
June 23, 1931.  S. H. LEWIS  1,811,434
FLUID PRESSURE OPERATED VALVE GEAR SHIFTING MECHANISM
Filed Sept. 5, 1923   3 Sheets-Sheet 3
Inventor
Samuel H. Lewis
By
Attorney Patented June 23, 1931

1,811,434

UNITED STATES PATENT OFFICE

SAMUEL HANCE LEWIS, OF RICHMOND, VIRGINIA

FLUID PRESSURE OPERATED VALVE GEAR SHIFTING MECHANISM

Application filed September 5, 1923. Serial No. 661,075.

This invention relates to fluid pressure operated apparatus for operating the valve gear of steam engines and more particularly railway locomotives and is an improvement over my prior Patent No. 1,221,876.

Devices of this character from which the best results have been obtained generally employ a pressure cylinder having a control piston mounted therein with a piston rod connected to the piston and extending through a suitable stuffing box for connection to the valve gear of an engine. The position of the piston referred to governs, through the valve gear, the direction of travel of the locomotive and the steam cut-off or percentage of the stroke of the locomotive pistons during which steam is admitted to the cylinders, the position of the control piston, in turn, being controlled by an operating valve.

To the operating valve there is usually connected a control lever, the position of which is adjustable along a toothed rack or sector and the successful performance of devices of this character depends upon the maintenance of the control piston in predetermined positions corresponding to the positions of the control lever, while existing devices of this character are notorious for their failure in this essential.

When the locomotive is stationary with the valve gear exerting approximately no force on the piston rod of the control piston the position of the piston will be stable if fluid pressure equalizes on opposite sides of the piston, but when the locomotive is traveling the valve gear exerts a force which tends to move the piston rod and a fluid pressure differential proportional to this force is required to maintain the piston in its predetermined position.

The difficulty of accomplishment of the maintenance of the control piston in predetermined positions corresponding to the positions of the control lever arises from the fact that the force exerted by the valve gear on the piston rod of the control piston is inconstant and tends to change the position of the control piston, and also on account of the tendency of the operating fluid to equalize on opposite sides of the control piston in the event of leakage of fluid pressure past the pressure cylinder packing.

To effect desired movement forward or backward of the control piston with the operating valve mechanisms now employed, air or other fluid is admitted to one end of the pressure cylinder and simultaneously exhausted from the other end of the cylinder by changing the position of the control lever to move the operating valve forward or backward from its neutral position. Movement of the control piston, during the movement of the control lever, acts through suitable mechanism to restore the operating valve to its neutral position.

Restoration of the operating valve to neutral position establishes connection between both ends of the pressure cylinder and the source of fluid pressure supply through the admission ports of the operating valve which allows fluid pressure to equalize on opposite sides of the control piston and serves to arrest movement of the control piston beyond a predetermined point, but with the devices now commonly employed there is a tendency for the control piston to move too far when returning the operating valve to the neutral position, often carrying the valve a sufficient distance past the neutral position to reverse the movement of the piston whereby the operating fluid is alternately admitted to and exhausted from the opposite ends of the pressure cylinder and causes reciprocating movements of the control piston before it comes to rest. A more serious fault of devices of this character is the tendency of the control piston to "creep" or move back and forth when the locomotive is traveling due to the action of the valve gear or leakage of fluid pressure causing a change in the pressure differential on opposite sides of the control piston which is required to counter-balance the force of the valve gear.

An important object of the present invention is to provide a valve structure to automatically effect, during the period that a locomotive is traveling, a proper pressure differential on opposite sides of the control piston, to compensate for leakage of fluid pressure to the low pressure end of the pressure cylinder and to maintain the control piston in a predetermined position and eliminate the creeping action referred to.

A further object of the invention is the provision of a valve which will not be carried beyond the neutral position after the control piston reaches a predetermined position relative to the position of the control lever when the position of the control lever is changed or when fluid pressure is suddenly admitted to the pressure cylinder from the source of supply.

Other objects and advantages of the invention will be apparent during the course of the following description.

In the drawings I have shown several embodiments of the invention. In this showing, Figure 1 is a side elevation of apparatus embodying my invention, Figure 2 is a section taken on line 2—2 of Figure 1, Figure 3 is a similar view taken on line 3—3 of Figure 2, Figure 4 is a similar view taken on line 4—4 of Figure 1, Figure 5 is a similar view taken on line 5—5 of Figure 3, Figure 6 is a similar view taken on line 6—6 of Figure 3, Figure 7 is a detail perspective view of the valve seat, Figure 8 is a similar view of one form of valve, Figure 9 is a similar view of a slightly modified form of valve, Figure 10 is a view similar to Figure 5 showing the modified form of valve in position, Figure 11 is a view similar to Figure 6 showing the employment of the modified form of valve, Figure 12 is a view similar to Figure 3 with the valve removed, Figure 13 is a rear face view of the valve seat, Figure 14 is a section on line 14—14 of Figure 12, and, Figure 15 is a detail section on line 15—15 of Figure 14.

Referring to the drawings, the numeral 10 designates a preferably horizontally arranged cylinder which is secured to the locomotive at any suitable point. A movable piston 11 is mounted within the cylinder 10 and rigidly connected with a piston rod 12, the forward end of which is provided with a depending arm 13 rigidly connected thereto. The piston rod 12 operates within suitable stuffing boxes 14. A link or pitman 15 is pivotally connected as at 16 with the forward end of the piston rod 12, the opposite end of the link 15 having suitable connection with the valve gear of the locomotive to shift it upon movement of the piston 11 and rod 12.

A bracket 17 is connected with the forward end of the cylinder and a lever 18 is pivotally connected to this bracket as at 19. The lower end of the lever 18 is pivotally connected as at 20 with one end of a link 21, the opposite end of which is pivotally connected as at 22 with the lower end of the arm 13. The upper end of the lever 18 has pivotal connection as at 23 with the forward end of a reach rod 24.

The numeral 25 designates a valve casing as a whole provided in one side with a recess 26 normally closed by a cap 27 which has screw-threaded connection with the casing 25. The inner end of the recess 26 has a flat preferably machined face 28 against which is maintained a valve seat designated as a whole by the numeral 29. The valve seat 29 is secured to the face 28 by suitable screws 30 having counter-sunk heads as shown in Figure 2.

Referring to Figure 7 it will be seen that the valve seat 29 is provided with an axial opening 31 in which is mounted a sleeve 32, the outer end of which projects beyond the outer face of the seat 29 as shown. The seat 29 is further provided with an axial opening 33 of slightly smaller diameter than the opening 31 communicating with the interior of the sleeve 32. The outer end of the opening 33 communicates with a central exhaust opening 33' in the casing 25. The valve seat 29 is provided with a pair of oppositely arranged upper ports 34 and a similar pair of lower ports 35. The outer face 36 of the valve seat 29, through which the ports 34 and 35 extend, is machined to a perfectly smooth surface to form a valve seat as will be understood. The face 36 extends outwardly beyond the body portion of the valve seat 29 as clearly shown in Figure 7. The valve seat 29 is provided at one side with an outstanding lug 37 the outer face of which is machined and flush with the face 36 for a purpose to be described. As shown in Figures 6, 11, 12, 13 and 14 the rear face of of the valve seat is provided with segmental pockets 35' each of which communicates with one of the ports 35 for a purpose to be described.

The casing 25 is provided rearwardly of the seat 29 with a pair of conduits 38 and 39. These conduits extend upwardly to points adjacent the upper ends of the upper ports 34 and communicate directly therewith. The conduits 38 and 39 are connected by pipes 40 and 41 with opposite ends of the cylinder 10. Thus it will be seen that the port 34 upon one side of the seat 29 is in constant communication with one end of the cylinder 10 while the other port 34 is in constant communication with the opposite end of the cylinder.

A valve designated by the numeral 42 is arranged within the casing 25 and its inner face 43 is machined to a smooth surface and adapted to seat against the outer face of the valve seat 29. The valve 42 is provided with an axial opening 44, the inner end of which is slightly enlarged and adapted to receive the projecting end of the sleeve 32. When the valve 42 is oscillated, as will be explained, the sleeve 32 acts as a bearing and maintains the valve 42 upon its proper center. A projection 45 extends outwardly from the outer face of the valve 42 for a purpose to be described. The lower portion of the inner face of the valve 42 is provided with cutout portions 46 and 47 and these cut-out portions communicate with the recess 26 through restricted openings 48. As shown in Figure 6 the outer edges of the openings 46 and 47 preferably exactly register with the inner edges of the ports 35. The upper portion of the valve is provided upon opposite sides with ports 49 and 50 which communicate with the upper portion of the recess 26. As clearly shown in Figures 3 and 5, the inner edges of the ports 49 and 50 are arranged a substantial distance outwardly of the ports 34 so that the valve 42 must be rotated through a substantial arc in either direction before one of the ports 49 or 50 will register with one of the ports 34. The valve 42 near its upper end and substantially centrally thereof is provided with a cut-out portion 51 which communicates through a drilled conduit 52 with the opening 44. As shown in Figures 3 and 5 the outer edges of the cut-out portion 51 are arranged a slight distance inwardly of the inner edges of the port 34 so that slight rotation of the valve will afford communication between the cut-out portion 51 and either of the ports 34.

A bolt 53 passes through one wall of the valve casing as shown in Figure 3. This bolt has a slotted counter-sunk head 54 and receives a nut 55 upon its inner end. One face of the nut 55 is adapted to contact with the lug 37 as shown in Figure 4 to prevent rotation of the nut when the device is in operation. Upper and lower faces 56 and 57 of a cut-out portion 58 of the valve 42 are adapted to contact with the nut 55 to limit the oscillating movement of the valve.

The valve casing 25 is provided with an inlet opening 59 adapted for connection with a pipe connected with a suitable source of fluid pressure supply. The opening 59 communicates through a port 60 with a transverse passage 61 leading into the recess 26 as shown in Figure 2. Pressure fluid entering through the passage 61 is adapted to act upon the outer face of the valve 42 to assist in maintaining the valve tightly against its face.

The valve casing 25 is provided with a cylindrical portion 62 which is surrounded by a rotatable sleeve 63 having an upper projection 64 as shown in Figure 2. The projection 64 is apertured for a purpose to be described. The cap 27 is provided with an axial opening 65 which receives a rotatable head 66. The head 66 is slotted as at 67 to receive the projection 45 of the valve 42. It will be obvious that rotation of the head 66 will rotate the valve 42. A stem 68 connects the head 66 with a pinion 69 arranged adjacent the outer face of the cap 27. A felt or other washer 70 is arranged between the head 66 and a shoulder 71 surrounding the stem 68. As shown in Figure 4 the head 66 is provided with an axial opening in which is mounted a spring 72 which bears against the outer face of the projection 45 and assists the fluid pressure in maintaining the valve 42 tightly against its seat. The spring 72 also tends to move the head 66 outwardly against the washer 70 to prevent leakage of fluid pressure around the stem 68.

The numeral 73 designates a vertically swinging lever, the lower end of which is pivotally connected by means of a bolt 74 with the forked end 75 of the reach rod 24. Intermediate its ends the lever 73 is provided with a boss 76 which contacts with the projection 64. A bolt 77 passes through the aperture in the projection 64 and through the boss 76 and lever 73. A segment gear 78 is riveted as at 79 to the lever 73. The gear 78 is provided with teeth 80 meshing with the teeth of gear 69 and the teeth 80 are arranged upon an arc of a circle, the center of which coincides with the center of the bolt 77.

The valve casing 25 is provided with a pair of upwardly diverging arms 81 and a quadrant 82 is rigidly secured at its ends to the upper ends of these arms. The quadrant 82 is provided with a series of substantially semi-circular notches 83 in its upper edge. A reciprocating latch-bolt 84 is mounted within an opening 85 in the lever 73 and the lower end of this latch bolt is adapted to be received within selected notches 83 as shown in Figures 1 and 2. The bolt 84 is connected by a pin 86 with a link 87 the upper end of which is pivotally connected with a handle 88 which in turn is pivotally connected as at 89 with the lever 73. A spring 90 connected with the lever 73 tends to urge the upper end of the handle 88 outwardly and the link 87 downwardly whereby the latch bolt 84 may be maintained in any desired position upon the quadrant. The upper end of the lever 73 adjacent the handle 88 is provided with a handle portion 91.

In Figures 9 to 11 inclusive, I have shown a somewhat modified form of valve 42. In this form the valve is provided with a cut-out portion 92, the outer edges of which correspond in position to the outer edges of the cut-out portions 46 and 47 of the preferred form of valve. Communication is afforded between the recess 26 and cut-out portion 92 by means of a restricted opening 93. In this form of valve, instead of the opening 52, I provide a pair of rectangular openings 94 communicating between the opening 51 and the axial opening 44. These openings 51 are preferably cast in the metal and closed by means of a plate 95.

Referring to Figures 14 and 15, the valve casing 25 is provided rearwardly of the recess 26 with a pair of bores 96 corresponding in arrangement to and communicating with the pockets 35' through ports 97. The outer ends of the bores 96 are enlarged as at 98 and provided with threaded plugs 99. The plugs 99 are apertured axially to receive the outer ends of stems 100 which are provided with sealing collars 101 maintained against seats 102 in the inner ends of the plugs 99 by coil springs 103. Thus it will be seen that leakage of pressure from the conduits 38 and 39 to the atmosphere through the bores 96 is effectually prevented. The inner ends of the stems 100 are provided with bores 104 and radial openings 105 communicating therewith. As will be obvious from an examination of Figure 14, the openings 105 are adapted to register with the ports 97 and communication therebetween may be regulated by revolving the stems 100 through the medium of handles 106.

While I have illustrated an adjustable valved connection between each of the ports 38 and 39 and the pockets 35', adjustment is desirable principally for forward motion of the locomotive and may be omitted for rearward motion, for a reason to be described.

The operation of the device is as follows:

When it is desired to drive the locomotive forwardly, the latch 84 is released by depression of the handle 88 and the lever 73 is moved forwardly, preferably to the last notch 83 when it is desired to get under headway rapidly. Since the piston 11 at the start is stationary, the connections between the piston and the reach rod 24 likewise will be stationary so that the lever 73 pivots upon the bolt 74. This action swings the bolt 77 forwardly carrying with it the projection 64. It is obvious that the bolt 77 will remain the same distance from the center of the valve casing at all times so that the teeth 80 of the segment gear will remain in mesh with the teeth of the pinion 69. Movement of the lever 73 as described rotates the valve 42 in a clockwise direction as seen in Figure 3 and opens communication between the cut-out portion 46 and its corresponding port 35 in the valve seat. This action permits passage of pressure fluid into the cut out portion 46, through its opening 48, through the corresponding ports 35, 35', 97, and 105, bores 104 and 96, to the passage 39, through pipe 41, thence to the rear end of the cylinder 10. When the lever 73 is swung to the extreme forward end of the quadrant the opening 49 will be placed in communication with its corresponding port 34. This action will permit an even greater flow of pressure fluid through passage 39 to the pipe 41 and into the cylinder 10 rearwardly of the piston 11. At the same time the cut-out portion 51 will be moved to registration with the other port 34 so that communication will be afforded between the openings 33 and 33' and the opposite end of the cylinder 10 thus exhausting air from this end of the cylinder. When pressure is applied within the rear end of the cylinder 10 and exhausted from the forward end it will be apparent that the rod 12 and link 15 will be moved forwardly to shift the valve mechanism of the locomotive. This action not only places the valve gear in forward position but draws the arm 13, link 21 and the lower end of the lever 18 forwardly. In turn the upper end of the lever 18 and the reach rod 24 will be moved rearwardly, and since the lower end of the lever 73 is connected with the reach rod 24, the lower end of the lever will be swung rearwardly, the lever pivoting upon the lower end of the latch bolt 84. This rearward swing of the lower end of the lever 73 causes rotation of the valve 42 in the opposite direction from that previously caused by the forward manual moving of the lever 73. The piston rod 12 will continue its forward movement and the valve 42 its reverse rotation until the valve reaches the neutral position as shown in Figure 3 with the outer edges of the cut-out portions 46 and 47 coinciding with the inner edges of the ports 35. At this point communication is established between the source of fluid pressure and both ends of the cylinder due to leakage past the outer edges of the cut-out portions 46 and 47. As is well known, when the valve gear of a locomotive is shifted forwardly and the throttle is open the valve gear tends to move the link 15 forwardly. This action tends to continue the reverse rotation of the valve 42 in a counter-clockwise direction beyond the neutral point so that communication will be afforded between the cut-out portion 47 and its corresponding port 35 and positively shuts off communication between port 46 and its port 35. Pressure then will be admitted more fully to the forward end of the cylinder 10 and admission of pressure cut off from the rear end of the cylinder thereby tending to arrest the forward movement of the piston. The counter-clockwise movement of the valve just described will move the cut-out portion 51 into registration with the port 34 which communicates with the rear end of the cylinder 10. Thus a small amount of air will be exhausted from the rear end of the cylinder so that a pressure differential is obtained upon opposite sides of the piston 11 which will be sufficient to prevent further forward movement of the piston. As soon as a sufficient pressure differential is set up in opposite ends of the cylinder 10, the valve will return substantially to normal position. Any further tendency of the piston 11 to creep will move the valve a very slight amount to permit passage of a minute quantity of pressure fluid through the cut out portion 47 to the forward end of the cylinder, but will entirely cut off leakage through the cut out portion 46. This movement will be so slight as to be negligible, however, and thus the piston and valve gear will be retained in a substantially stable position for any given position of the lever 73.

If there is no leakage past the piston, the reduction of pressure in the rear end of the cylinder will create a sufficient pressure differential to cause the piston to move rearwardly a sufficient distance to close communication between ports 51 and 34 and thus prevent further escape of pressure from the rear end of the cylinder whereby a sufficient pressure differential will be maintained to hold the piston stationary and in proper position with respect to the position of the lever 73. If there is a leakage past the piston, there is a tendency for the pressure upon opposite sides of the piston to equalize thus permitting the piston to be moved forwardly by the pull of the valve gear. For the efficient operation of the device it is desirable that some means be employed for compensating for this leakage and thus maintain the proper pressure differential upon opposite sides of the piston. It is obvious that opening of the exhaust ports is dependent upon the forward movement of the piston. When leakage is present past the piston as where the latter becomes worn, the admission of air into the forward end of the cylinder at a rapid rate prevents forward movement of the piston and consequently prevents the opening of the exhaust port to exhaust air from the rear end of the cylinder. However the constant leakage past the piston soon establishes a condition approaching pressure equalization in the cylinder whereupon the piston is urged forwardly by the valve gear of the locomotive and the exhaust valve opens to reduce pressure in the rear end of the cylinder. In actual practice it has been found that under this condition, the valve swings too far in a counter-clockwise direction thus exhausting too much air from the rear of the cylinder. Pressure in the front end of the cylinder then moves the piston rearwardly until the condition is again established where the exhaust valve is wholly closed. The above movements again occur and are repeated continuously because of the momentum of the moving parts. By diminishing the rate of flow of air into the forward end of the cylinder by regulating the stem 100, the pressure in the forward end of the cylinder will be built up slowly and hence the piston will not move rearwardly sufficiently to entirely close exhaust from the rear of the cylinder. Thus the back and forth, or oscillating movement of the valve 42 will be prevented. The function of the auxiliary valves is to limit the rate of flow of fluid pressure regardless of the swinging of the valve 42. Thus if the latter valve swings a material distance past normal position, pressure fluid normally would be rapidly transmitted to the forward end of the cylinder and thus would too rapidly build up pressure therein. By turning the auxiliary valve associated with the forward end of the cylinder, the rate of flow will be limited. Obviously, since a locomotive is moving forwardly the greater portion of the time, it is more desirable to adjust the auxiliary valves during such forward movement than during the rearward movement of the locomotive.

After the locomotive is under way and it is not necessary to utilize the full working stroke of the engine pistons, the lever 73 may be moved manually toward the center with the latch bolt 84 engaging any of the notches 83. This action will introduce additional air pressure into the forward end of the cylinder 10 and exhaust air from the rear end thereof thus moving the piston rod 12 and valve mechanism rearwardly until a balanced position is reached. It will be apparent that any effective piston stroke of the engine may be employed from zero to full length by varying the position of the lever 73 with respect to the quadrant 82.

When it is desired to move the locomotive rearwardly it of course will be understood that the lever 73 must be moved toward the rear end of the quadrant 82 so that the pressure will be introduced into the forward end of the cylinder 10 and air exhausted from the rear end thereof to move the piston 11 toward the rear end of the cylinder and set the valve gear in reverse position.

When the lever 73 has been moved toward one end of the quadrant 82 and the reach rod is moving to return the valve to neutral position as described, it will be apparent that communication first will be closed through ports 49 and 50 as will be obvious from Figure 5 and communication next will be closed through the exhaust port 51. Thus when the valve 42 returns nearly to its neutral position the only communication afforded between the source of fluid pressure and the cylinder 10 will be through one of the restricted openings 48. This operation, wherein the ports 49 and 50 and the port 51 are progressively cut out of registration with their respective ports in the valve seat results in the admission of air to the cylinder 10 through the smaller areas of the openings 48. The rapid reduction in the areas of air admission tends to slow down the movement of the piston and associated elements thus tending to prevent the movement of the parts from carrying the valve beyond its neutral position.

It occasionally happens that, when a locomotive is left standing with the fluid pressure cut off from the valve mechanism, the engineer or other workman moves the operating lever to the opposite end of the quadrant. For instance if the piston, in existing mechanisms, is at the rear end of its stroke with the valve mechanism in backward gear and the operating lever at the rear end of the quadrant, the lever may be moved to the forward end without affecting movement of the piston and valve gear if the fluid pressure is cut off. When the locomotive again is started by opening the throttle the locomotive will move rearwardly while the operating lever will be in the forward position indicating to the engineer that the valve mechanism is in the forward position. With the present construction, however, this is impossible. If the locomotive is standing with the air pressure cut off, it will be impossible to move the operating lever 73 from the rear portion of the quadrant since rotary movement of the valve will be limited by the face 57 of the cut-out portion 58 of the valve. Thus it will be impossible for the engineer to be misled as to the setting of the valve gear.

It will be apparent that when the engaging faces of the valve and valve seat become badly worn after long usage, they may be readily removed so that the engaging faces may be reground or new parts substituted.

It also will be apparent that the expanse of intervening metal between the exhaust port 51 and the admission ports 49 and 50 will effectually prevent leakage between these ports.

It is to be understood that the forms of my invention herewith shown and described are to be taken as a preferred examples of the same, and that various various changes in the shape, size, and arrangement of parts may be resorted to without departing from the spirit of the invention or the scope of the subjoined claims.

Having thus described my invention, I claim:

1. The combination with a cylinder, a piston mounted to reciprocate therein, and means for connecting the piston to the valve gear of a steam engine, of a valve seat provided with admission ports communicating with opposite ends of the cylinder and an exhaust opening communicating with the atmosphere, a valve engaging said seat and provided with a plurality of admission ports adapted to move progressively into and out of registration with the admission ports of said seat the admission port of said valve which initially moves into registration with one of the admission ports of said seat being of restricted area, said valve being further provided with an exhaust port adapted to afford communication between one port of said seat and the exhaust opening of said seat when the valve is moved a predetermined distance, and means for supplying fluid pressure to said admission ports.

2. The combination with a cylinder, a piston mounted to reciprocate therein, and means for connecting the piston to the valve gear of a steam engine, of a valve seat provided with admission ports communicating with opposite ends of the cylinder and an exhaust opening communicating with the atmosphere, a valve engaging said seat and provided with a plurality of admission ports adapted to move progressively into and out of registration with the admission ports of said seat, the admission port of said valve which initially moves into registration with one of the admission ports of said seat being of constant restricted area, said valve being further provided with an exhaust port adapted to afford communication between one port of said seat and the exhaust opening of said seat when the valve is moved a predetermined distance, means for supplying fluid pressure to said admission ports, a lever connected with said valve to shift it, means connecting one end of said lever to the piston, a stationary quadrant mounted adjacent the opposite end of said lever, and means for locking said lever in pivotal engagement on said quadrant at selected positions.

3. The combination with a cylinder, a piston mounted to reciprocate therein, and means for connecting the piston to the valve gear of a steam engine, of a valve seat provided with admission ports communicating with the opposite ends of the cylinder and an exhaust opening communicating with the atmosphere, a valve engaging said seat and provided with a plurality of admission ports adapted to move progressively into and out of registration with the admission ports of said seat, the admission port of said valve which initially moves into registration with one of the admission ports of said seat being of constant restricted area, said valve being further provided with an exhaust port adapted to afford communication between one port of said seat and the exhaust opening of said seat when the valve is moved a predetermined distance, means for supplying fluid pressure to said admission ports, and means connected between said piston and said valve for returning the latter to normal position.

4. The combination with a cylinder, a piston mounted to reciprocate therein, and means for connecting the piston to the valve gear of a steam engine, of a valve seat provided with a plurality of ports communicating with opposite ends of the cylinder and an exhaust opening communicating with the atmosphere, a valve engaging said seat and provided with a pair of relatively large admission ports each adapted to communicate through certain ports of said seat with one end of the cylinder and being provided with restricted admission means adapted to communicate through certain other ports of said seat with either end of the cylinder upon initial movement of said valve, said relatively large admission ports being adapted to open after substantial movement of the valve, said valve being further provided with an exhaust port adapted to afford communication between either of two ports of said seat and the exhaust opening of said seat to exhaust one end of the cylinder when fluid pressure is admitted into the opposite end, and means for supplying fluid pressure to said admission ports.

5. The combination with a cylinder, a piston mounted to reciprocate therein, and means for connecting the piston to the valve gear of a steam engine, of a valve seat provided with a plurality of ports communicating with opposite ends of the cylinder and an exhaust opening communicating with the atmosphere, a valve engaging said seat and provided with a pair of relatively large admission ports each adapted to communicate through certain ports of said seat with one end of the cylinder, and being further provided with restricted admission means adapted to communicate through certain other ports of said seat with either end of the cylinder upon initial movement of said valve, said relatively large admission ports being adapted to open after substantial movement of the valve, said valve being further provided with an exhaust port adapted to afford communication between either of two ports of said seat and the exhaust opening of said seat to exhaust one end of the cylinder when fluid pressure is admitted into the opposite end, means for supplying fluid pressure to said admission ports, and means connected between said piston and said valve for returning the latter to normal position.

6. The combination with a cylinder, a piston mounted to reciprocate therein, and means for connecting the piston to the valve gear of a steam engine, of a valve casing provided with an admission chamber, means for suplying fluid pressure to said chamber, a valve seat in said chamber provided with a plurality of ports of substantial area communicating through said casing with opposite ends of the cylinder and being further provided with an exhaust opening communicating with the atmosphere, and a valve engaging said seat and provided with inlet means in its engaging face and restricted communicating means between said inlet means and said admission chamber, said valve inlet means being normally disposed between and adapted immediately to communicate with one of a pair of said seat ports upon movement of the valve in either direction, said restricted communicating means being adapted to limit and make constant the flow of fluid through said inlet means during a relatively large portion of valve movement, said valve being further provided with an exhaust port arranged between a pair of said valve seat ports and communicating with the exhaust opening in said valve seat, said exhaust port being adapted to communicate with one of the valve seat ports after said valve is moved an appreciable distance to one side of its normal position and to increase communication during the remainder of the valve movement.

7. The combination with a cylinder, a piston mounted to reciprocate therein, and means for connecting the piston to the valve gear of a steam engine, of a valve casing provided with an admission chamber, means for supplying fluid pressure to said chamber, a valve seat mounted in said casing and provided with a plurality of ports of substantial area communicating through said casing with opposite ends of the cylinder and being further provided with an exhause opening communicating with the atmosphere, a manually operable valve engaging said seat and provided with inlet means in its engaging face and restricted communicating means between said inlet means and said admission chamber, said inlet means being normally disposed between and adapted immediately to communicate with one of a pair of said seat ports upon movement of the valve in either direction, said restricted communicating means being adapted to limit and make constant the flow of fluid through said inlet means during a relatively large portion of valve movement, said valve being further provided with an exhaust port arranged between a pair of said valve seat ports and communicating with the exhaust opening in said valve seat, said exhaust port being adapted to communicate with one of the valve seat ports after the valve is moved an appreciable distance to one side of its normal position and to increase communication during the remainder of the valve movement, said valve being further provided with a pair of relatively large inlet ports communicating with said inlet chamber and adapted to communicate with certain of the valve seat ports after the valve has been moved beyond the point where communication is established through said exhaust port, and means connected between said piston and said valve for returning the latter to normal position.

8. The combination with a cylinder, a piston mounted to reciprocate therein, and means for connecting the piston to the valve gear of a steam engine, of a valve casing provided with an admission chamber, means for supplying fluid pressure to said chamber, a valve seat mounted in said casing and provided adjacent each side with a pair of oppositely arranged spaced ports communicating through said casing with opposite ends of said cylinder and being further provided with an axial exhaust opening, a manually operable valve engaging said seat and provided with inlet means arranged between one of said pairs of ports and an exhaust port arranged between the other of said pairs of ports, the outer extremities of said inlet means normally coinciding with the inner egdes of its corresponding pair of valve seat ports, the outer edges of said exhaust port being spaced slightly from the inner edges of its corresponding pair of valve seat ports, said inlet means being provided with restricted means communicating with said admission chamber, said exhaust port being provided with an opening communicating with said axial exhaust port, said valve being further provided with a pair of relatively large inlet ports arranged outwardly of said exhaust port, said inlet ports being in communication with said admission chamber and spaced a substantial distance outwardly of said pair of valve seat ports corresponding to said exhaust port, and means connected between said piston and said valve for returning the latter to normal position.

9. The combination with a cylinder, a piston mounted to reciprocate therein and means for connecting the piston to the valve gear of a steam engine, of a valve seat provided with a pair of ports communicating with each end of said cylinder and being further provided with an exhaust port, a valve engaging said seat and provided with an inlet port corresponding to each port of said seat and being further provided with an exhaust port in constant communication with the exhaust port of said seat, means for supplying fluid pressure to said valve inlet ports, the inlet ports of said seat being adapted to move progressively into and out of registration with the ports of said seat, the exhaust port of said valve being adapted to communicate with a port of one pair of ports in said seat when fluid pressure is admitted to the other pair of ports, means independent of said valve for varying the fluid pressure admission from one inlet port of said valve to said cylinder, and means connected between said piston and said valve for returning the latter to normal position.

10. The combination with a cylinder, a piston mounted to reciprocate therein, and means for connecting the piston to the valve gear of a steam engine, of a valve seat provided with a pair of admission ports communicating with opposite ends of the cylinder and an exhaust opening communicating with the atmosphere, a valve engaging said seat and adapted to move in either direction from normal position, said valve being provided with admission means lying between said ports when the valve is in normal position, and adapted to communicate with one of said ports upon initial movement of the valve in either direction from normal position, said valve being provided with an exhaust port and a pair of admission ports, said valve seat being further provided with a second pair of ports communicating with opposite ends of the cylinder, the exhaust port of said valve being adapted to communicate with one of said second pair of admission ports upon appreciable movement of said valve, one of the admission ports of said valve being adapted to communicate with one of said second pair of the admission ports of said seat upon further movement of said valve, and means for supplying fluid pressure to the admission means and admission ports of said valve.

In testimony whereof I affix my signature.

SAMUEL HANCE LEWIS.